March 20, 1951  J. A. CAMPBELL  2,545,512
FLUID PRESSURE BRAKE CONTROL APPARATUS
Filed Nov. 24, 1948
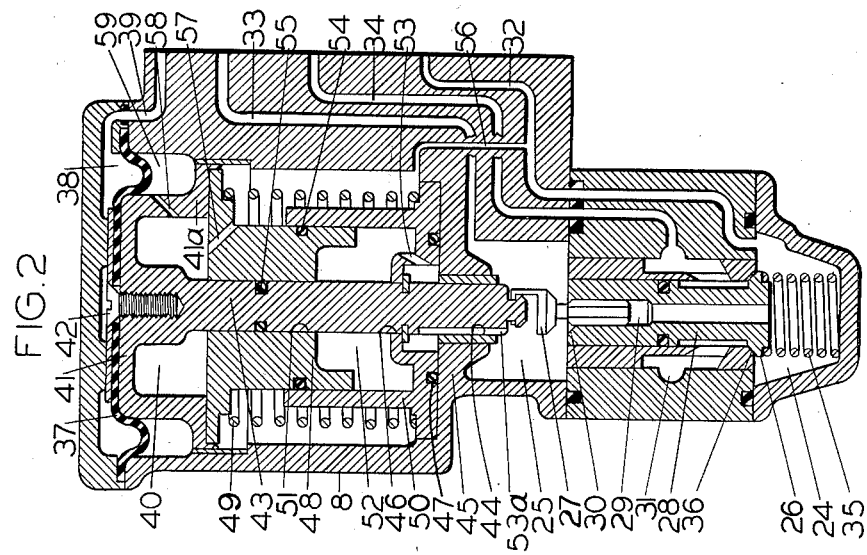
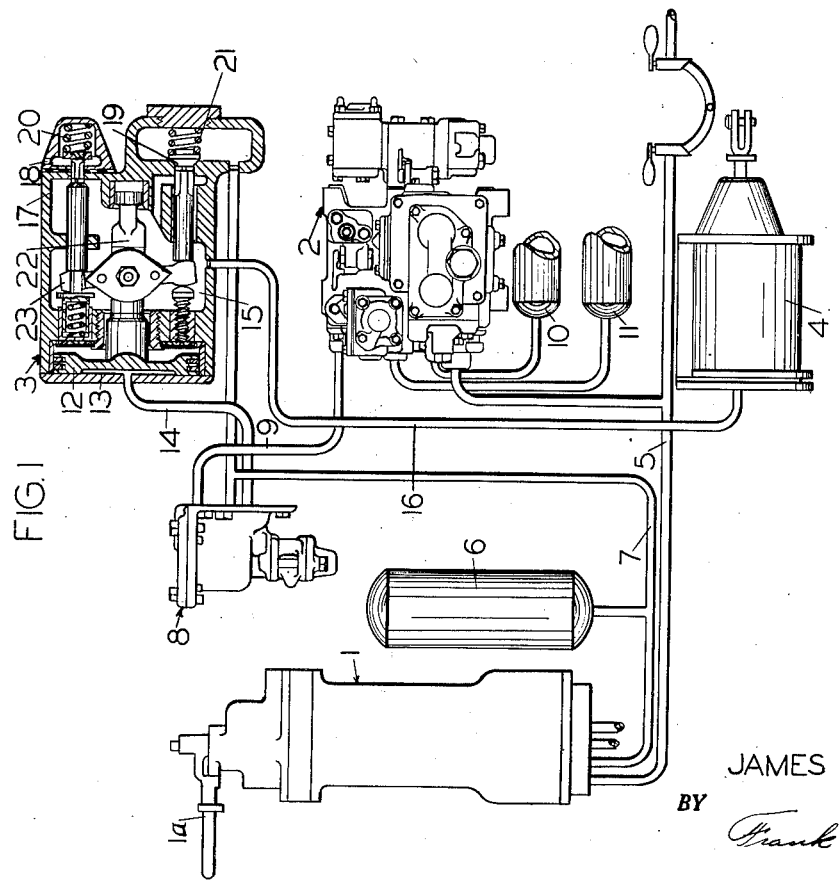
INVENTOR.
JAMES A CAMPBELL
BY
Frank E. Miller,
ATTORNEY Patented Mar. 20, 1951

2,545,512

UNITED STATES PATENT OFFICE 2,545,512

FLUID PRESSURE BRAKE CONTROL APPARATUS

James A. Campbell, Berkeley, Calif., assignor to The Westinghouse Air Brake Company, Wilmerding, Pa., a corporation of Pennsylvania Application November 24, 1948, Serial No. 61,808

6 Claims. (Cl. 303—40)

This invention relates to fluid pressure brake control apparatus and more particularly to the type employed on railway locomotives.

In controlling freight trains down long grades it is necessary to hold light applications of brakes for a considerable length of time, due to which, the brake shoes, as well as the tires of the driver wheels of a locomotive, have a tendency to become undesirably overheated, resulting in excessive wear and a possibility of loosening said tires.

The principal object of the invention is therefore the provision of means adapted to be applied to locomotive brake equipment for so regulating an application of brakes on the locomotive as to obviate the above difficulty.

Accordingly to this object, I provide a device adapted to be associated with a locomotive brake equipment for, under the condition above mentioned, automatically limiting the degree of braking of a train by the locomotive to a reasonable, but less than normal degree, so as to obviate the above difficulty, but which will permit an increase in the share of train braking by the locomotive to normal when a greater degree of braking is required for slowing down or stopping the train.

Other objects and advantages will appear in the following more detailed description of the invention which is illustrated by the accompanying drawing, wherein Fig. 1 is a diagrammatic view, partly in section, of a locomotive fluid pressure brake apparatus embodying one form of the invention and Fig. 2 is a diagrammatic, sectional view, at an enlarged scale, of a differential relay device forming a part of said apparatus.

DESCRIPTION

As shown in the drawing, the locomotive brake apparatus comprises an engineer's automatic brake valve device 1, a brake controlling valve device 2, a fluid pressure relay valve device 3, a brake cylinder device 4, a brake pipe 5 adapted to be connected through a train and to which said brake valve device 1 and brake controlling valve device 2 are connected, and a main reservoir 6 connected by a main reservoir pipe 7 to said brake valve device 1 and said relay valve device 3. The structure so far mentioned may be conventional and well-known, the brake valve device 1 being provided for varying the pressure of fluid in the brake pipe by use of an operating handle 1a, and the brake controlling valve device 2 being responsive to variations in brake pipe pressure to provide fluid at a proportional pressure to a brake cylinder control pipe 9 leading to the relay valve device 3, the supply of fluid being supplied from an auxiliary reservoir 10 or from both the auxiliary reservoir and an emergency reservoir 11.

The relay valve device 3 comprises a piston 12 at one side of which there is a chamber 13 adapted to receive fluid under pressure from pipe 9 by way of a pipe 14. At the opposite side of piston 12 is a chamber 15 open to a pipe 16 connected to the brake cylinder device 4. The relay valve device also comprises an exhaust valve 17 exposed on one side to the chamber 15 and on the other side to atmosphere by way of passage 18, and further comprises a supply valve 19, one side of which is subject to fluid under pressure from pipe 7 and the opposite side being exposed to chamber 15. A valve spring 20 urges exhaust valve 17 in the direction of the left hand toward its normal unseated position and a valve spring 21 urges supply valve 19 in the direction of the left hand toward its normal seated position, the force of spring 21 on the supply valve 19 being preferably slightly greater than that of spring 20 in valve 17. A lever 23 having its opposite ends arranged to engage and seat and unseat the exhaust valve 17 and supply valve 19, respectively, is connected at its center to a stem 22 projecting from piston 12.

According to the invention, a differential relay valve device 8 is added to the brake apparatus above described for regulating the pressure of fluid effective in chamber 13 of the relay valve device 3 via pipe 12 in accordance with the pressure of fluid provided in pipe 9 by operation of the brake controlling valve device 2, and hence in accordance with the degree of reduction in pressure in brake pipe 5.

The differential relay valve device 8 comprises a casing having chambers 24 and 25 containing valves 26 and 27, respectively. The valve 26 is provided on one end of a sleeve 28 slidably mounted in the casing and having an axial through bore 29 and a seat 30 encircling the end of said bore 29 which is open to chamber 25, said seat being provided for cooperation with valve 27 to close communication between chambers 24 and 25. Adjacent valve 26 is an annular chamber 31 encircling the sleeve 28, the valve 26 controlling communication between said chamber and chamber 24. The valve chambers 24 and 25 are open respectively by passages 32 and 33 to pipe 14 and atmosphere, while the annular chamber 31 is open by a passage 34 to the main reservoir pipe 7. A spring 35 contained in chamber 24 acts on valve 26 for urging it to its seat 36.

The differential relay valve device 8 further comprises a flexible diaphragm 37 at one side of which is a chamber 38 open to the brake cylinder control pipe 9 by way of a passage 39. At the opposite side of diaphragm 37 is a chamber 40 containing a diaphragm follower 41 secured centrally to the diaphragm 37 by a screw 42. The follower 41 has a depending skirt portion 41a in slidable contact with a wall of the casing and in which there is provided a port 58 for equalizing fluid pressures within and encircling same. The follower 41 also has a stem 43 slidably extending through a bore 44 in a partition wall 45 into the chamber 25 wherein it is connected to valve 27 for moving said valve with the diaphragm 37.

In chamber 40 there is disposed a cylinder 50 having a closed end engaging the partition wall 45. A sealing ring 47 is placed between cylinder 50 and partition wall 45 to prevent communication between chamber 40 and chamber 25. Slidably mounted in the cylinder 50 is a piston 48 of smaller area than diaphragm 37 and adapted to engage the skirt portion 41a of follower 41, an equalizing port 57 in said piston opening the space within said skirt portion to the space encircling said piston and the cylinder 50. Interposed between cylinder 50 and piston 48 is a precompressed spring 49 urging said piston against the follower 41 with a chosen degree of force, such for example, as to prevent movement of diaphragm 37 by less than eight pounds pressure of fluid in chamber 38, the area of said piston subject to pressure of fluid in chamber 40 being such as to move out of contact with follower 41 against said spring when subject in chamber 40 to fluid at a pressure less than obtained therein upon a full service reduction in brake pipe pressure, as will be hereinafter described. The cylinder 50 and piston 48 are provided with aligned axial bores 46 and 51, respectively, through which the follower stem 43 slidably extends. Between the piston 48 and cylinder 50 is an atmospheric chamber 52 open through a passage 53 in cylinder 50, and a passage 53a in the follower stem 43 to valve chamber 25 and thence to atmosphere. A sealing ring 54 is positioned between the cylinder 50 and the piston 48 to prevent communication between chamber 40 and chamber 52. Likewise, a sealing ring 55 is placed between the piston 48 and the follower stem 43 to prevent communication between chamber 40 and chamber 52. Chamber 40 containing piston 48 and cylinder 50 and encircling same and open to the adjacent face of diaphragm 37 is open through a relatively small passage 56 to passage 32 and pipe 14.

OPERATION

Charging of the equipment

Assuming that the main reservoir 6 is charged with fluid under pressure, the fluid pressure brake equipment illustrated in the drawing is charged as follows:

The operating handle 1a of the brake valve device 1 is placed in either release position or running position as is usual. In either of these positions, fluid under pressure is supplied from the main reservoir 6 to the brake pipe 5 by way of main reservoir pipe 7 and through the usual brake pipe charging ports and passages (not shown) in the automatic brake valve device 1. Fluid under pressure thus supplied to the brake pipe 5 flows to the brake controlling valve device 2. The brake controlling valve device 2 operates in response to supply of fluid under pressure to the brake pipe in the usual manner to supply fluid under pressure to the auxiliary reservoir 10 and to the emergency reservoir 11 and also to establish communication between the brake cylinder control pipe 9 and the atmosphere.

With the control pipe 9 connected to atmosphere, chamber 38 in the differential relay valve device 8 is connected to atmosphere therethrough to permit spring 49 to move piston 48 against follower 41 and move both said piston and follower in an upwardly direction to the position in which they are shown in the drawing, resulting in unseating of valve 27 by stem 43 and seating of valve 26 by spring 35. This seating of valve 26 disconnects the main reservoir pipe 7 from the delivery chamber 24, while the opening of valve 27 connects said chamber and thereby pipe 14 to atmosphere by way of passage 32, chamber 24, bore 29, chamber 25 and passage 33. With pipe 14 connected to atmosphere, chamber 13 of the relay valve device 3 will likewise be connected to atmosphere by way of pipe 14 thereby permitting valve springs 20 and 21 to move piston 12 to the left-hand position and at the same time to unseat exhaust valve 17 and to seat supply valve 19. With exhaust valve 17 of the relay valve device 3 unseated, the brake cylinder device 4 is connected to atmosphere by way of pipe 16, chamber 15, past said valve and through passage 18 for releasing the locomotive brakes.

Automatic application of the brakes

Upon a reduction in pressure in brake pipe 5 effected in the usual manner by means of the automatic brake valve device 1, the brake controlling valve device 2 operates in the usual well-known manner to cut off communication between pipe 9 and atmosphere and to supply fluid from the auxiliary reservoir 10 or from both the auxiliary reservoir 10 and the emergency reservoir 11 to the pipe 9 and thereby to the control chamber 38 of the differential relay valve device 8, at a pressure corresponding to the reduction in brake pipe pressure. When the pressure of fluid thus provided in chamber 38 increases to a degree (such as eight pounds) sufficient to overcome the opposing force of spring 49, the diaphragm 37 flexes downward and through the medium of the diaphragm follower 41 and the follower stem 43 seats the exhaust valve 27 against the valve seat 30, thereby cutting off communication from the delivery chamber 24 to the exhaust chamber 25, followed by movement of sleeve 28 by said valve to move valve 26 off of valve seat 36 for establishing communication between the supply chamber 31 and the delivery chamber 24, whereupon fluid under pressure present in the supply chamber 31 from the main reservoir pipe 7 flows past the valve 26 and through the delivery chamber 24 to the delivery line 32 and thence to chamber 13 of the relay valve device 3 by way of pipe 14.

As fluid under pressure is thus supplied to the delivery line 32 and chamber 13 of the relay valve device 3, fluid will also flow from said line through the relatively small passage 56 into chambers 40 and 59, said passage being relatively small to so restrict supply of fluid under pressure to said chambers as to permit the pressure of fluid in chamber 13 of the relay valve device 3 to increase substantially in unison with the increase in pressure in chambers 40 and 59.

When fluid under pressure is supplied to chambers 40 and 59 as just mentioned it will act in one direction against diaphragm 37 in opposition to pressure of fluid in chamber 38 and in the opposite direction on the exposed face of piston 48 the opposite face of which is subject to atmospheric pressure in chamber 52. Hence as fluid under pressure is supplied to chamber 40, the pressure of spring 49 on diaphragm 37 will be reduced in accordance with the pressure of such fluid acting on piston 48, until at a chosen pressure of fluid in chamber 40, such as thirty five pounds, the piston 48 will move out of contact with follower 41 against said spring and completely remove pressure of said spring from diaphragm 37.

Assuming that the reduction in pressure in brake pipe 5 is such that the brake control valve device 2 operates to provide in pipe 9 fluid at eight pounds pressure or less, the spring 49 in the differential relay valve device 8 will prevent movement of diaphragm 37. If such pressure is increased to ten pounds, the diaphragm 37 will operate as above described to open the supply valve 26 and supply fluid to chamber 13 in the relay valve device 3 and to chambers 40 and 59 of the differential relay valve device 8 until the pressure of such fluid acting on diaphragm 37, plus the correspondingly reduced effect of spring 49 (due to such pressure acting on the smaller area of piston 48), is increased to a degree sufficient to overcome the opposing pressure of fluid in chamber 38, whereupon the diaphragm 37 will be deflected against the latter pressure to permit closure of valve 26 by spring 35 thereby limiting the pressure of fluid obtained in chamber 13 of the relay valve device 3 to a degree (such as two pounds) corresponding to the reduced effectiveness of spring 49. If the pressure of fluid provided in chamber 38 be twenty pounds, the supply valve 26 will close when the pressure of fluid obtained in chamber 13 increases to, for example, twelve pounds. If the pressure of fluid in chamber 38 is increased to thirty five pounds or to any higher degree up to and including that (fifty pounds) usually obtained upon a full service reduction in brake pipe pressure, the pressure of fluid obtained in chamber 40 and acting on piston 48 will overcome and move said piston relative to diaphragm 37 against spring 49 whereupon the supply valve 26 will remain open until the pressure of fluid in chamber 38 is overcome solely by the pressure of fluid in chambers 40 and 59, whereby the pressure of fluid in chambers 40 and 59 and in chamber 13 of the relay valve device 3 will equal substantially that provided in diaphragm chamber 38.

From the above description it will now be seen that if the reduction in pressure in brake pipe 5 is such as to provide eight pounds or less pressure of fluid in diaphragm chamber 37 of the differential relay valve device 8, diaphragm chamber 13 of the relay valve device 3 will remain open to atmosphere, but if the pressure of fluid in diaphragm chamber 37 is increased, fluid will be provided in chamber 13 of the relay valve device 3 at a pressure gradually increasing in accordance with the increase in pressure in chamber 38 and the corresponding diminishing effect of spring 49 on diaphragm 37, until at the chosen relatively high pressure of fluid, such as thirty five pounds in chamber 38, the spring 49 will become totally ineffective to oppose pressure of fluid in chamber 38 on diaphragm 37 whereupon and for any further increase in pressure of fluid in chamber 38, the pressure of fluid in chamber 13 of the relay valve device 3 will increase to substantially the same degree as provided in chamber 38.

The relay valve device 3 is operative to reproduce in the brake cylinder device 4 the pressure of fluid provided in chamber 13, in a well-known manner. Briefly however, when fluid under pressure is supplied to chamber 13, the piston 12 moves to the right and through the medium of piston stem 22 and the rocker arm 23 causes the exhaust valve 17 to seat, for cutting off communication of the brake cylinder device 4 to atmosphere by way of chamber 15, and unseats the supply valve 19 for establishing communication between the main reservoir pipe 7, which is charged with fluid under pressure from the main reservoir 6, and chamber 15 which is connected to brake cylinder device 4 by way of pipe 16, whereupon fluid under pressure is permitted to flow to the brake cylinder device for applying the brakes. When the fluid pressure in the brake cylinder device 4 and in chamber 15 acting on the right-hand face of piston 12 then becomes increased to approximately the same degree as acting in chamber 13, the piston 12 will move to the left far enough to permit spring 21 to close the supply valve 19 for thereby limiting the pressure of fluid obtained in the brake cylinder device to substantially the same degree as provided in pipe 14.

*Release after automatic application of the brakes*

If it is desired to release the brakes after an application, the operating handle 1a is moved to either the release or running position for thereby supplying fluid under pressure to the brake pipe 5 and the brake controlling device 2 as described in the charging of the equipment. Upon supply of fluid under pressure to the brake controlling device 2, the said control device operates in the usual manner to recharge the auxiliary reservoir 10 and the emergency reservoir 11 and to establish communication between pipe 9 and the atmosphere as hereinbefore described in connection with the charging of the equipment.

With pipe 9 vented to atmosphere, the chamber 38 of the differential relay device 8 will be vented. With these conditions, the fluid pressure in chambers 40 and 59 and the spring 49 will move the piston 48 and the diaphragm 37 to the normal position shown in Fig. 2 of the drawing in which position the fluid pressure in pipe 14 will be released to atmosphere by way of passage 32, chamber 24, bore 29, unseated valve 27, chamber 25 and passage 33. When pipe 14 is vented, chamber 13 of relay valve device 3 will also be vented to atmosphere. With this condition, the fluid pressure in chamber 15 will move the piston 12 to the left to the position shown in Fig. 1 of the drawing to permit closing of the supply valve 19 by spring 21 and opening of the release valve 17 by spring 20 for releasing fluid under pressure from the brake cylinder device 4 to release the brakes on the locomotive.

SUMMARY

From the above description it will now be seen that when the brakes on a train are held partially applied for a considerable length of time, as common in braking a train on long descending grades, the differential relay valve device 8 will act to hold the locomotive brakes either released or applied to less than the usual degree dependent upon the degree of reduction in brake pipe pressure, for thereby reducing the undesirable tendency of excessive wear and overheating of the locomotive brake shoes and wheel tires resulting with locomotive brake equipments at present in use. The safety of the train is not however jeopardized at any time since the differential relay value device provides for automatically increasing the proportion of train braking done by the locomotive up to the normal degree in case greater braking of the train is required to provide adequate control thereof. It is to be especially noted that the above advantages are obtained merely by adding the differential relay valve device 8 to the usual locomotive brake apparatus, as above described.

Having now described my invention, what I claim as new and desire to secure by Letters Patent, is:

1. In a locomotive fluid pressure brake equipment, in combination, a brake pipe, brake means operable by fluid under pressure to effect an application of brakes, brake controlling means responsive to a reduction in brake pipe pressure to supply fluid at a pressure corresponding to the degree of such reduction, valve means controlling a communication for conveying fluid under pressure to said brake means, movable abutment means operable by fluid under pressure supplied by said brake controlling means to operate said valve means to open said communication, and operable by fluid under pressure supplied to said brake means to effect operation of said valve means to close said communication, precompressed spring means for acting on said abutment means in opposition to pressure of fluid supplied by said brake controlling means, and piston means interposed between said movable abutment means and spring means subject to pressure of fluid in said brake means opposing pressure of said spring means.

2. In a locomotive fluid pressure brake equipment, in combination, a brake pipe, brake means operable by fluid under pressure to effect an application of brakes, brake controlling means responsive to a reduction in brake pipe pressure to supply fluid at a pressure corresponding to the degree of such reduction, valve means controlling a communication for conveying fluid under pressure to said brake means, movable abutment means exposed at one side to pressure of fluid provided by said brake controlling means and at the opposite side to pressure of fluid in a chamber open to said brake means and operable by the former pressure to operate said valve means to open said communication, precompressed spring means in said chamber adapted to act on said abutment means in cooperation with pressure of fluid therein to effect operation of said valve means to close said communication, and a second movable abutment interposed between said spring means and the first named movable abutment subject opposingly to pressure of fluid in said chamber and atmospheric pressure for reducing the pressure of said spring means on the first named abutment in accordance with pressure of fluid in said chamber.

3. An apparatus for delaying supply of fluid under pressure to a pipe leading to a fluid pressure actuated brake applying means upon supply of fluid under pressure to a second pipe by operation of a brake controlling device in response to a reduction in pressure in a brake pipe, comprising in combination, a casing connected to said pipes, a valve in said casing controlling a fluid pressure supply communication to the first named pipe, a movable abutment in said casing, means in said casing subjecting one side of said abutment to pressure fluid in said second pipe for operating said valve to open said communication, and precompressed spring means in said casing acting on said abutment in opposition to pressure fluid in said chamber for effecting operation of said valve to close said communication.

4. An apparatus for delaying supply of fluid under pressure to a pipe leading to a fluid pressure actuated brake applying means upon supply of fluid under pressure to a second pipe by operation of a brake controlling device in response to a reduction in pressure in a brake pipe, comprising in combination, a casing connected to said pipes, a valve in said casing controlling a fluid pressure supply communication to the first named pipe, a movable abutment in said casing, means in said casing subjecting one side of said abutment to pressure of fluid in said second pipe for operating said valve to open said communication, means in said casing subjecting the opposite side of said abutment to pressure of fluid in the first named pipe, precompressed spring means in said casing acting on said opposite side of said abutment for preventing operation of said abutment and thereby said valve to open said communication with less than a chosen pressure of fluid acting on said one side of said abutment, and a second movable abutment in said casing interposed between the first named abutment and said spring means and subject opposingly to pressures of fluid in said first named pipe and atmosphere for reducing the pressure of said spring means on said first named abutment in proportion to the increase in pressure in said first named pipe in excess of said chosen pressures.

5. In combination, fluid pressure actuated brake applying means, a first pipe for conveying fluid under pressure to said means, a brake pipe, a second pipe, brake application means operative upon a reduction in pressure in said brake pipe to supply fluid at a proportional pressure to said second pipe, and a brake application device connected to said first and second pipes comprising valve means controlling a fluid pressure supply communication to said first pipe, a movable abutment arranged to be operated by pressure of fluid in said second pipe to operate said valve means to open said communication and means for preventing movement by said abutment by fluid from said second pipe at less than a chosen pressure.

6. In combination, fluid pressure actuated brake applying means, a first pipe for conveying fluid under pressure to said means, a brake pipe, a second pipe, brake application means operative upon a reduction in pressure in said brake pipe to supply fluid at a proportional pressure to said second pipe, and a brake application device connected to said first and second pipes comprising valve means controlling a fluid pressure supply communication to said first pipe, a movable abutment arranged to be operated by pressure of fluid in said second pipe to operate said valve means to open said communication, precompressed spring means opposing pressure of fluid in said second pipe acting on said abutment means, and means operable by pressure of fluid in said first pipe to reduce the opposing pressure of said spring means in proportion to the pressure of fluid in said first pipe.

JAMES A. CAMPBELL.

REFERENCES CITED

The following references are of record in the file of this patent:

UNITED STATES PATENTS

| Number | Name | Date |
| --- | --- | --- |
| 2,256,404 | McNeal | Sept. 16, 1941 |
| 2,294,601 | Hewitt | Sept. 1, 1942 |
| 2,405,632 | Baldwin | Aug. 13, 1946 |